United States Patent
Ogata et al.

(10) Patent No.: US 8,850,087 B2
(45) Date of Patent: Sep. 30, 2014

(54) STORAGE DEVICE AND METHOD FOR CONTROLLING THE SAME

(71) Applicant: Hitachi, Ltd., Tokyo (JP)

(72) Inventors: Ran Ogata, Tokyo (JP); Naoyuki Masuda, Tokyo (JP); Yoichi Mizuno, Tokyo (JP); Yutaka Takata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/111,864

(22) PCT Filed: Dec. 5, 2012

(86) PCT No.: PCT/JP2012/081449
§ 371 (c)(1),
(2), (4) Date: Oct. 15, 2013

(87) PCT Pub. No.: WO2014/087497
PCT Pub. Date: Jun. 12, 2014

(65) Prior Publication Data
US 2014/0214771 A1    Jul. 31, 2014

(51) Int. Cl.
*G06F 13/38*    (2006.01)
*G06F 11/14*    (2006.01)

(52) U.S. Cl.
CPC ................ *G06F 11/1446* (2013.01)
USPC .................. 710/33; 710/14; 710/17

(58) Field of Classification Search
None
See application file for complete search history.

(56) References Cited

U.S. PATENT DOCUMENTS

| | | | |
|---|---|---|---|
| 6,008,743 A * | 12/1999 | Jaquette | 341/51 |
| 2007/0220225 A1 | 9/2007 | Nakamura et al. | |
| 2009/0100223 A1 | 4/2009 | Murayama et al. | |
| 2010/0023685 A1 | 1/2010 | Ikejiri et al. | |
| 2011/0231605 A1 | 9/2011 | Ogawa et al. | |
| 2011/0283075 A1 | 11/2011 | Jess et al. | |
| 2012/0198151 A1 | 8/2012 | Kato et al. | |

FOREIGN PATENT DOCUMENTS

| | | |
|---|---|---|
| JP | 2007249573 A | 9/2007 |
| JP | 2010033261 A | 2/2010 |
| JP | 2012516498 A | 7/2012 |
| WO | 2011052005 A1 | 5/2011 |

OTHER PUBLICATIONS

Yohei Yoshida, "Storage virtualization/ Thin provisioning becomes standard/ Difference in the release area and pool design", Nikkei Computer, Feb. 3, 2012, No. 749, pp. 111-115.

* cited by examiner

*Primary Examiner* — Cheng-Yuan Tseng
(74) *Attorney, Agent, or Firm* — Volpe and Koenig, P.C.

(57) ABSTRACT

The present invention provides the function of dynamically switching the allocation of snapshot data in a pool according to the use status of the pool. More specifically, the present invention provides the function of dynamically switching a storage mode to be applied to the pool from a storage mode in which the snapshot data is aggregated in a specific pool volume to a storage mode in which the snapshot data is distributed to plural pool volumes, or from the storage mode in which the snapshot data is distributed to the plural pool volumes to the storage mode in which the snapshot data is aggregated in the specific pool volume, according to the use status of the pool.

13 Claims, 12 Drawing Sheets

Effective conditions for switching from access performance priority mode to pool capacity compression mode

| Pool usage ratio | Pool aggregation ratio | Random IO ratio | Mode switching effect |
|---|---|---|---|
| High | High | | Ineffective |
| High | Low | High/Low | Effective/Ineffective |
| Low | High | | Ineffective |
| Low | Low | | Ineffective |

FIG. 7

| Conditions for determining switching of pool storage mode | Threshold value |
|---|---|
| Threshold value of pool usage ratio for determining switching from pool capacity compression mode to access performance priority mode | 20% |
| Threshold value of pool usage ratio for determining switching from access performance priority mode to pool capacity compression mode | 80% |
| Threshold value of pool aggregation ratio for determining switching from pool capacity compression mode to access performance priority mode | 80% |
| Threshold value of pool aggregation ratio for determining switching from access performance priority mode to pool capacity compression mode | 20% |
| Threshold value of sequential IO for determining switching from pool capacity compression mode to access performance priority mode | 80% |
| Threshold value of random IO for determining switching from access performance priority mode to pool capacity compression mode | 80% |

FIG. 8

IO observation table

| IO type | IO count |
|---|---|
| Random | 1000 |
| Sequential | 2000 |

Effective conditions for switching from pool capacity compression mode to access performance priority mode

| Pool usage ratio | Pool aggregation ratio | Sequential IO ratio | Mode switching effect |
|---|---|---|---|
| High | High | | Ineffective |
| High | Low | | Ineffective |
| Low | High | | Ineffective |
| Low | Low | High/Low | Effective/Ineffective |

FIG. 13

SVOLSLOT#-to-POOLVOLSLOT# conversion table

| SVOL# | SLOT# | Allocation state | Operation mode | POOLVOL# | SLOT# |
|---|---|---|---|---|---|
| 0x0000 | 0x0000 | Allocated | Performance priority mode | 0x8000 | 0x0000 |
| 0x0000 | 0x0001 | Allocated | Performance priority mode | 0x8000 | 0x0001 |
| 0x0000 | 0x0002 | Allocated | Performance priority mode | 0x8000 | 0x0002 |
| ... | ... | ... | ... | ... | ... |
| 0x0001 | 0x0100 | Allocated | Performance priority mode | 0x8002 | 0x0100 |
| 0x0001 | 0x0101 | Allocated | Performance priority mode | 0x8002 | 0x0101 |
| 0x0001 | 0x0102 | Allocated | Performance priority mode | 0x8002 | 0x0102 |
| ... | ... | ... | ... | ... | ... |
| 0x0002 | 0x0200 | Allocated | Performance priority mode | 0x8003 | 0x0058 |
| 0x0002 | 0x0201 | Allocated | Performance priority mode | 0x8003 | 0x0059 |
| 0x0002 | 0x0202 | Allocated | Performance priority mode | 0x8003 | 0x005A |

FIG. 14

PAGE# management table

| POOLVOL# | PAGE# | Allocation state | SVOL# | Head SLOT# in page |
|---|---|---|---|---|
| 0x8000 | 0x0000 | Allocated | 0x0000 | 0x0000 |
| ... | ... | ... | ... | ... |
| 0x8002 | 0x8002 | Allocated | 0x0001 | 0x0000 |
| ... | ... | ... | ... | ... |
| 0x8003 | 0x8003 | Allocated | 0x0002 | 0x0000 |

FIG. 16

POOLSLOT#-to-SVOLSLOT# conversion table

| POOLVOL# | SLOT# | Allocation state | Operation mode | SVOL# | SLOT# |
|---|---|---|---|---|---|
| 0x8000 | 0x0000 | Allocated | Pool capacity compression mode | 0x0000 | 0x0000 |
| 0x8000 | 0x0001 | Allocated | Pool capacity compression mode | 0x0000 | 0x0001 |
| 0x8000 | 0x0002 | Allocated | Pool capacity compression mode | 0x0000 | 0x0002 |
| ... | ... | ... | ... | ... | ... |
| 0x8002 | 0x0100 | Allocated | Pool capacity compression mode | 0x0001 | 0x0100 |
| 0x8002 | 0x0101 | Allocated | Pool capacity compression mode | 0x0001 | 0x0101 |
| 0x8002 | 0x0102 | Allocated | Pool capacity compression mode | 0x0001 | 0x0102 |
| ... | ... | ... | ... | ... | ... |
| 0x8003 | 0x0200 | Allocated | Pool capacity compression mode | 0x0002 | 0x0058 |
| 0x8003 | 0x0201 | Allocated | Pool capacity compression mode | 0x0002 | 0x0059 |
| 0x8003 | 0x0202 | Allocated | Pool capacity compression mode | 0x0002 | 0x005A |

US 8,850,087 B2

STORAGE DEVICE AND METHOD FOR CONTROLLING THE SAME

TECHNICAL FIELD

The present invention relates to a storage device adopting storage virtualization technology, and a method for controlling the same.

BACKGROUND ART

Background arts of the technical field include Patent Literature 1. This publication states that "a system for dynamic storage provisioning may comprise: a means for detecting a storage hot-spot located in a first storage pool; and a means for creating a first point-in-time copy of a virtual volume including the storage hot-spot located in the first storage pool in a second storage pool according to the result of the detection." (Refer to Abstract.) In short, Patent Literature 1 discloses the technology of storing more frequently accessed data in higher-performance devices and storing less frequently accessed data in lower-performance devices.

CITATION LIST

Patent Literature

Patent Literature 1: Japanese Patent Application Publication No. 2012-516498

SUMMARY OF INVENTION

Technical Problem

Heretofore, a snapshot volume (or a secondary volume) has been used mainly for backup applications. The backup applications demand that data be placed so as to reduce capacity utilization of a pool. Meanwhile, there has also recently been the emergence of a form in which plural pieces of created snapshot data are allocated to virtual servers and each of the pieces of data is used in an online environment. In this case, a storage device is required to provide a high level of performance of access to the snapshot data.

Therefore, the present invention provides a technology for dynamically relocating snapshot data in a pool according to the use status of the pool.

Solution to Problem

In order to solve the foregoing problems, the present invention has the function of dynamically switching the placement of snapshot data allocated to a pool according to the use status of the pool. More specifically, the present invention has the function of dynamically switching between a storage mode in which the snapshot data is aggregated in a certain pool volume and a storage mode in which the snapshot data is distributed to plural pool volumes.

Advantageous Effects of Invention

According to the present invention, the placement of snapshot data can be dynamically switched according to the use status of a pool. Objects, configurations and effects other than the above will be apparent from the following description of embodiments.

BRIEF DESCRIPTION OF DRAWINGS

FIG. 7 is a table illustrating an example of a table of threshold values for determining the switching of the pool storage mode.

FIG. 8 is a table of assistance in explaining an IO observation table.

FIG. 13 is a table of assistance in explaining an SVOLSLOT#-to-POOLVOLSLOT# conversion table.

FIG. 14 is a table of assistance in explaining a PAGE# management table.

FIG. 16 is a table of assistance in explaining a POOLSLOT#-to-SVOLSLOT# conversion table.

DESCRIPTION OF EMBODIMENTS

Figure 1:
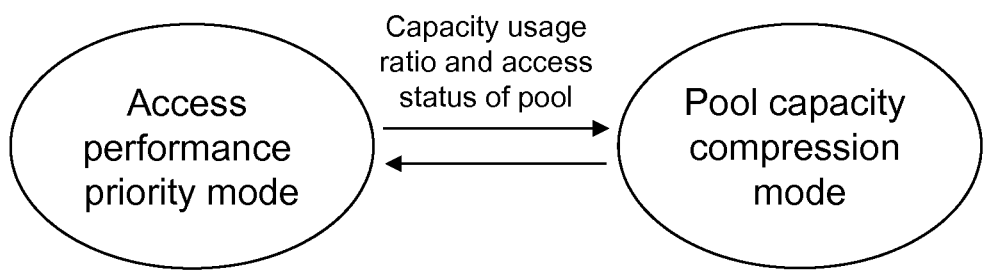
FIG. 1 is a conceptual illustration of switching of pool storage mode.

Embodiments of the present invention will be described in detail below with reference to the drawings. Incidentally, the same or related reference characters designate the same functions throughout the figures of assistance in explaining the embodiments, and repeated description of the same functions will be omitted. Also, in the following embodiments, description of the same or similar parts will not be repeated in principle unless otherwise necessary.

Dynamic Switching of Pool Storage Mode

FIG. 1 is a conceptual illustration of dynamic switching of pool storage mode, provided herein.

As illustrated in FIG. 1, a storage device according to the embodiment has the function of dynamically switching the pool storage mode from a pool capacity compression mode to a snapshot data access performance priority mode (hereinafter called an "access performance priority" mode), or from the access performance priority mode to the pool capacity compression mode, according to the capacity usage ratio and the access status of the pool.

As employed herein, the pool capacity compression mode refers to a storage mode in which physical capacity that is manageable can be increased, as compared to the access performance priority mode. In the pool capacity compression mode, slots are forward-filled and allocated in one page thereby to achieve minimization of pool capacity utilization.

Meanwhile, the access performance priority mode refers to a storage mode in which, at the time of access to a snapshot volume, response performance and throughput performance can be improved, as compared to the pool capacity compression mode. In the access performance priority mode, improvements in the response performance and the throughput performance are achieved by "reduction in processing in the process of address conversion" and "sequential access on virtual addresses."

By the function of dynamically switching the pool storage mode, the storage device according to the embodiment always optimizes the placement of snapshot data according to the state of pool use.

Configuration of Overall System

Figure 2:
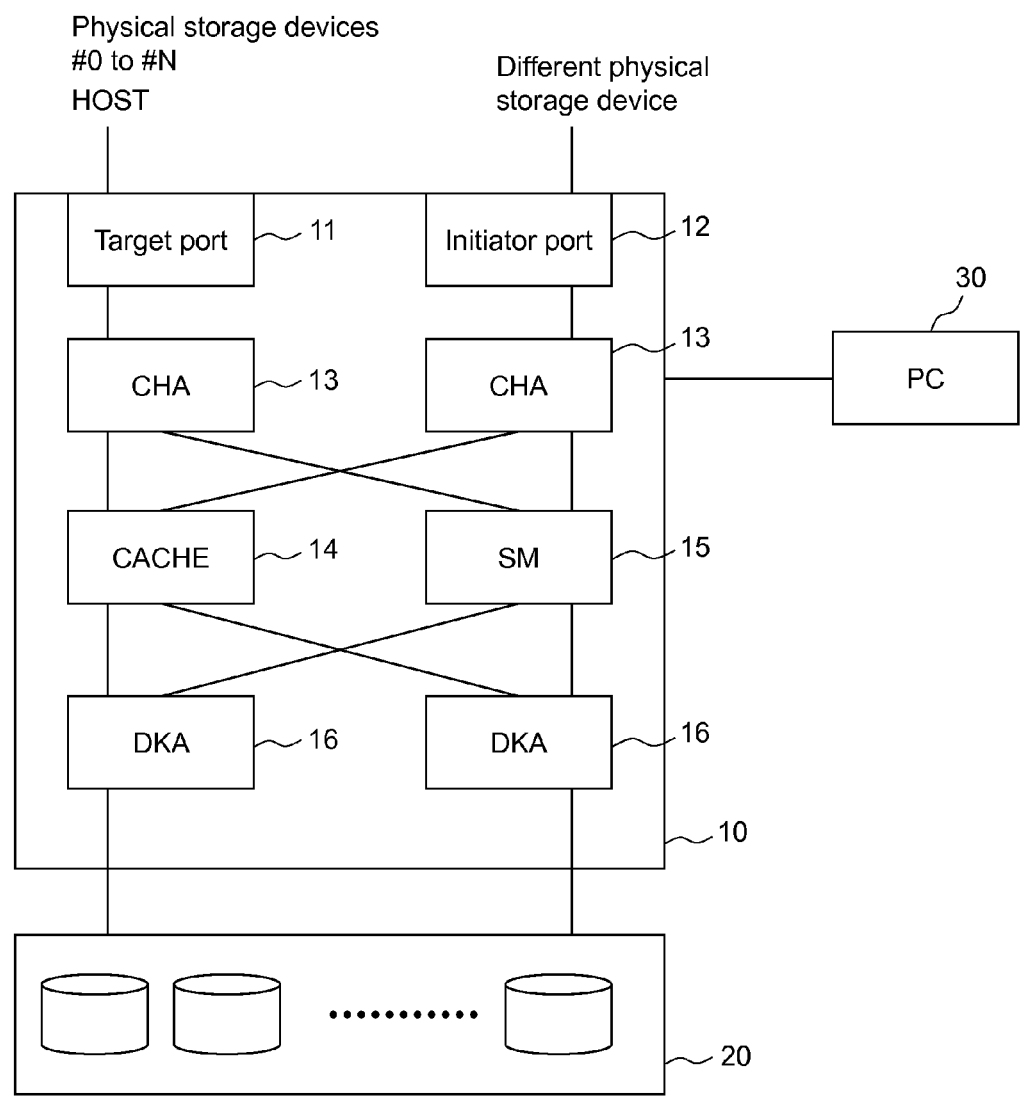
FIG. 2 is a diagram illustrating an example of configuration of a storage device.

FIG. 2 illustrates an example of configuration of the storage device having the above-described function of dynamically switching the pool storage mode. A storage device 1 according to the embodiment is formed of a control unit 10, a storage unit 20, and a management PC (personal computer) 30. The control unit 10 is formed of a target port 11, an initiator port 12, a channel adapter (CHA) 13, a cache memory (CACHE) 14, a shared memory (SM) 15, and a disk adapter (DKA) 16.

The target port 11 serves as an interface I/F to receive a frame of a read/write command from a host or transmit a frame of response to the command to the host. A connection destination of the target port 11 may be an initiator port of a different physical storage device.

The initiator port 12 serves as an interface I/F to issue a frame of a read/write command to a different physical storage device or receive a response frame from the different physical storage device. The initiator port 12 is connected to a target port of the different physical storage device in order to turn into the host.

The channel adapter (CHA) 13 performs bidirectional copy control, host control, control of a different physical storage device, or the like. Also, the channel adapter 13 executes dynamic switching processing for the pool storage mode. Details of the dynamic switching processing for the pool storage mode will be described later.

The cache memory (CACHE) 14 serves as a memory area to be used to hold read/write data. The shared memory (SM) 15 serves as a memory area to hold management information for use in the bidirectional copy control. Here, the management information manages a correspondence between address spaces. The disk adapter (DKA) 16 serves as an interface I/F through which read/write data is inputted from and outputted to the storage unit.

The storage unit 20 is formed of a storage medium (or a physical device) such as an HDD (hard disk drive) or an SSD (solid state drive). The storage unit 20 is formed of plural HDDs of RAID (Redundant Arrays of Independent Disks) configuration, for example. The management PC 30 is a terminal to set management information for implementation of bidirectional copy, and an SVP (service processor)/remote console may be used.

Pool Storage Mode

Figure 3:
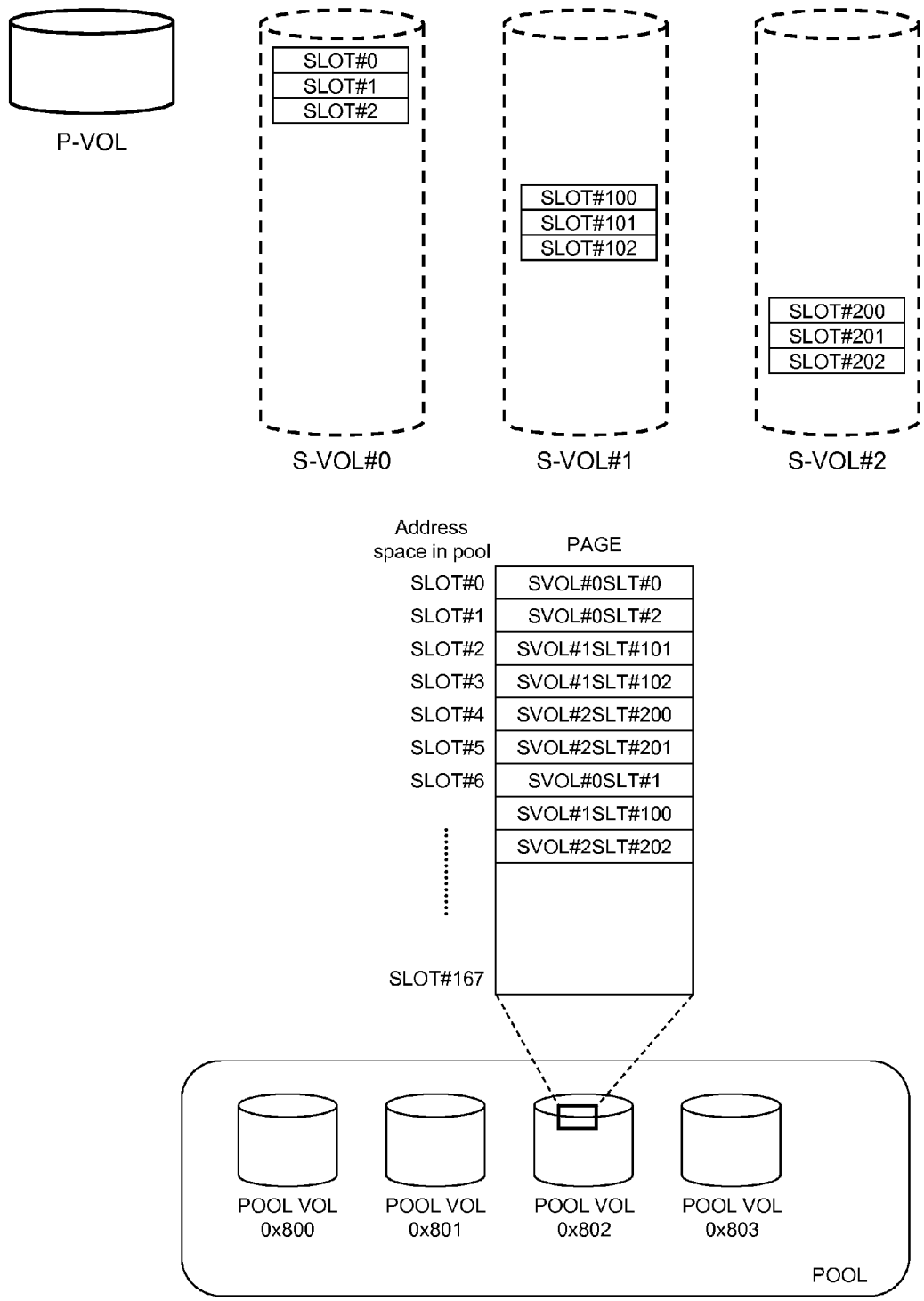
FIG. 3 is an illustration of an example of data placement in a pool capacity compression mode.

FIG. 3 illustrates an example of data placement in a pool capacity utilization priority mode. In the upper part of the drawing, there is illustrated an example of data placement of slots in three physical volumes (indicated by dashed lines). In the lower part of the drawing, there is illustrated data placement of slots in a pool.

As illustrated in FIG. 3, in the case of the pool capacity utilization compression mode, the slots corresponding to the three physical volumes are aggregated in one page and are forward-filled and stored from the position of the beginning Here, further, the page is stored in one pool volume in the pool. This data placement does not tend to waste the address space of the pool and is thus suitable for a user who regards a reduction in the pool capacity utilization as paramount. As illustrated in FIG. 3, however, the slots corresponding to plural physical volumes coexist together in the page, and moreover, the order of the slots does not necessarily match the order of the slots on the physical volume side. Therefore, access to data retained in the pool capacity utilization priority mode requires that address conversion processing be performed many times, which in turn leads correspondingly to degradation in access performance. Thus, the pool capacity utilization priority mode is suitable for retention of infrequently accessed data, such as retention of backup data.

Figure 4:
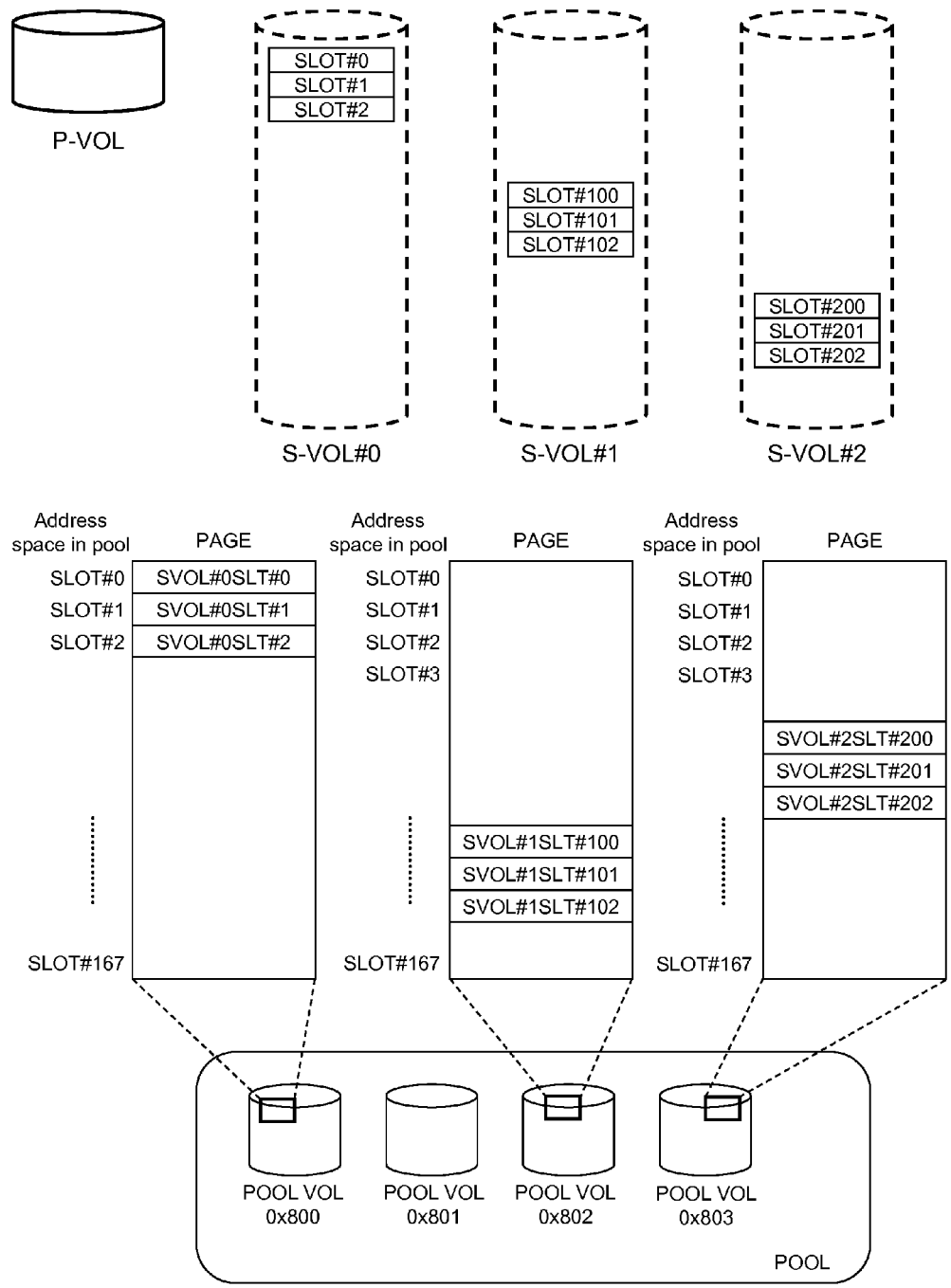
FIG. 4 is an illustration of an example of data placement in an access performance priority mode.

FIG. 4 illustrates an example of data placement in the access performance priority mode. In the upper part of the drawing, there is illustrated an example of data placement of slots in three physical volumes, as is the case with FIG. 3. Also, in the lower part of the drawing, there is illustrated data placement of slots in a pool.

As illustrated in FIG. 4, in the case of the access performance priority mode, three pool volumes are reserved in the pool in such a way as to correspond to the three physical volumes. The slots of the corresponding physical volume are sequentially stored in a page in each of the volumes. In the case of this pool storage mode, however, the storage of the slots in the corresponding volume is not limited to being forward-filled. In the case of FIG. 4, the slots corresponding to the physical volumes S-VOL#1 and S-VOL#2 are placed in the latter part of the page.

This data placement is prone to waste the pool capacity utilization because of consuming the pool volume and the page for each physical volume. However, sequential access in the page is possible, thus enhancing the access performance. Also, physical volume access does not concentrate on one physical volume but is distributed, thus achieving a high level of access performance. Thus, the access performance priority mode is suitable for a situation where a snapshot volume is allocated to a virtual server and used in an online environment.

Necessity for Pool Storage Mode Switching

Implementation of a snapshot function requires allocation management of a virtual address and a real address, and the management requires management information (table) for data size which is inversely proportional to snapshot acquisition granularity and is proportional to the pool capacity. The capacity of snapshot data to be stored in a pool can become increasingly larger in the future, and the data size of the management information (table) can also become increasingly larger in the future.

Incidentally, the management information (table) is currently stored in the shared memory 15. However, the shared memory 15 is higher in price as compared to a hard disk or the like, and hence there arises the necessity to change a target for storage of the management information (table) to a bulk memory such as the hard disk.

However, the bulk memory such as the hard disk is lower in access performance than a volatile memory. Therefore, compression of the control information (table) and a reduction in frequency of access thereto are required for management of the management information (table) on the hard disk side (also including management of part only thereof). In other words, even storage of snapshot data for backup applications may demand the pool storage mode in which the access performance is paramount, depending on system configuration.

Also, when page granularity (42 MB) allocated from a pool is different from snapshot data acquisition granularity (256 KB), the access performance or pool utilization varies depending on snapshot data placement. For example, when slots are forward-filled and managed in page units (or in units of 42 MB) in order to minimize the pool utilization, the address conversion processing requires that the address conversion be performed two times in total, specifically, conversion from a snapshot data address into a virtual address and then a pool data address be performed.

Also, for a user who desires to use a snapshot volume in an online environment although the user does not need to minimize the pool capacity utilization, it is necessary to reduce the number of times the address conversion is to be performed in order to improve access performance characteristics.

Thus, the snapshot function requiring both the reduced pool capacity utilization and the access performance needs the dynamic switching of the pool storage mode according to user's purposes or system configuration.

Switching Conditions for Pool Storage Mode

Figures 5, 6:
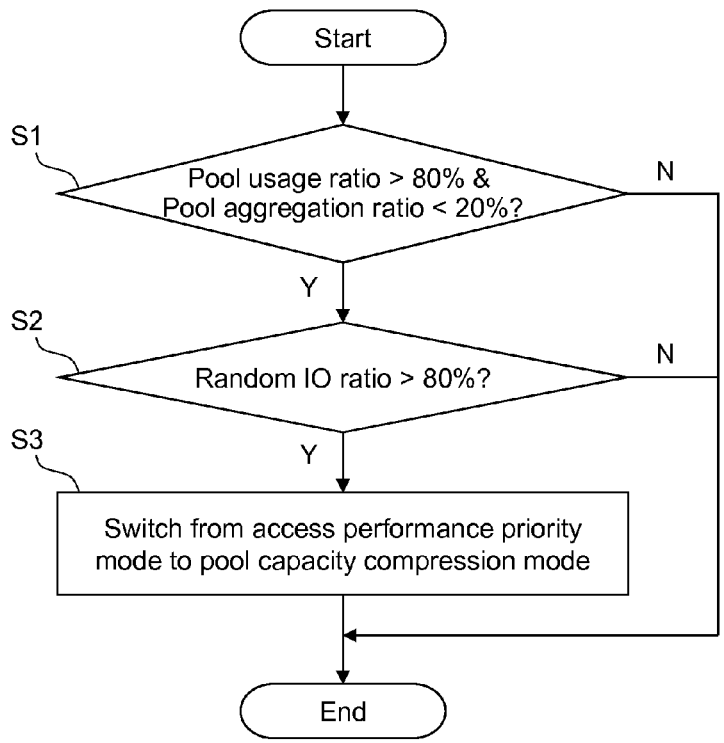
FIG. 5 is a table of assistance in explaining conditions under which switching from the access performance priority mode to the pool capacity compression mode is effective.
FIG. 6 is a flowchart illustrating a specific example of operation for determining the switching of the pool storage mode (an example of switching from the access performance priority mode to the pool capacity compression mode).

FIG. 5 illustrates effective conditions for switching from the access performance priority mode to the pool capacity compression mode. FIG. 5 illustrates a relationship between combinations of a pool usage ratio, a pool aggregation ratio and a random IO ratio and a mode switching effect. The pool usage ratio is information indicating the ratio of used capacity to capacity allocated to a pool. As the pool usage ratio becomes higher, free capacity becomes smaller. The pool aggregation ratio is information indicating the degree of aggregation of used area to the capacity allocated to the pool. As the pool aggregation ratio becomes lower, the used area is distributed. The random IO ratio indicates the ratio of random IOs to all IOs. As the random IO ratio becomes higher, the number of times reading and writing is performed becomes larger, which in turn leads to degradation in the access performance. FIG. 5 indicates that, when both the pool usage ratio and the random IO ratio are high and the pool aggregation ratio is low, the effect of switching the pool storage mode from the access performance priority mode to the pool capacity compression mode is observed.

FIG. 6 illustrates an example of determination operation which is executed when the current pool storage operation is in the access performance priority mode. This determination operation is executed by the channel adapter (CHA) 13. Incidentally, the determination operation is automatically executed at periodic intervals or when a predetermined condition is established. The determination operation by the channel adapter 13 requires threshold values to determine whether parameters are high or low. FIG. 7 illustrates an example of a table of threshold values for the pool storage mode switching determination. Numeric values illustrated in FIG. 7 are default values. However, the threshold values may be individually changed by a user. The user can freely change the threshold values, and thereby, the ease or difficulty of switching of the pool storage mode can be optimized according to the user's applications. Also, numeric values which give an "effective" range or numeric values which give an "invalid" range may be used in place of the threshold values.

Returning to description of FIG. 6, first, at the time of determination, the channel adapter 13 determines whether or not the pool usage ratio is higher than 80% and whether or not the pool aggregation ratio is lower than 20% (at step S1). When a negative result is obtained at step S1, the channel adapter 13 determines that a change to the pool capacity compression mode has no particular effect, and terminates this determination operation. When an affirmative result is obtained at step S1, the channel adapter 13 determines whether or not the random IO ratio is higher than 80% (at step S2). Also when a negative result is obtained at step S2, the channel adapter 13 determines that a change to the pool capacity compression mode has no particular effect, and terminates this determination operation. On the other hand, when an affirmative result is obtained at step S2, the channel adapter 13 switches the pool storage mode to the pool capacity compression mode, and then terminates the determination operation (at step S3).

Incidentally, the random IO ratio is calculated by the channel adapter 13, based on the count of an IO observation table illustrated in FIG. 8. The channel adapter 13 calculates the random IO ratio by dividing the count of the random IOs by the sum of the count of the random IOs and the count of sequential IOs. Incidentally, the count of the IO observation table is sequentially updated according to a flowchart illustrated in FIG. 9. This updating processing is also executed by the channel adapter 13. First, the channel adapter 13 executes required IO processing (at step S11). Then, the channel adapter 13 determines whether or not the IO processing is the random IO (at step S12). When an affirmative result is obtained, the channel adapter 13 counts up the random IO count of the IO observation table (at step S13). When a negative result is obtained, the channel adapter 13 counts up the sequential IO count of the IO observation table (at step S14).

Figures 9, 10:
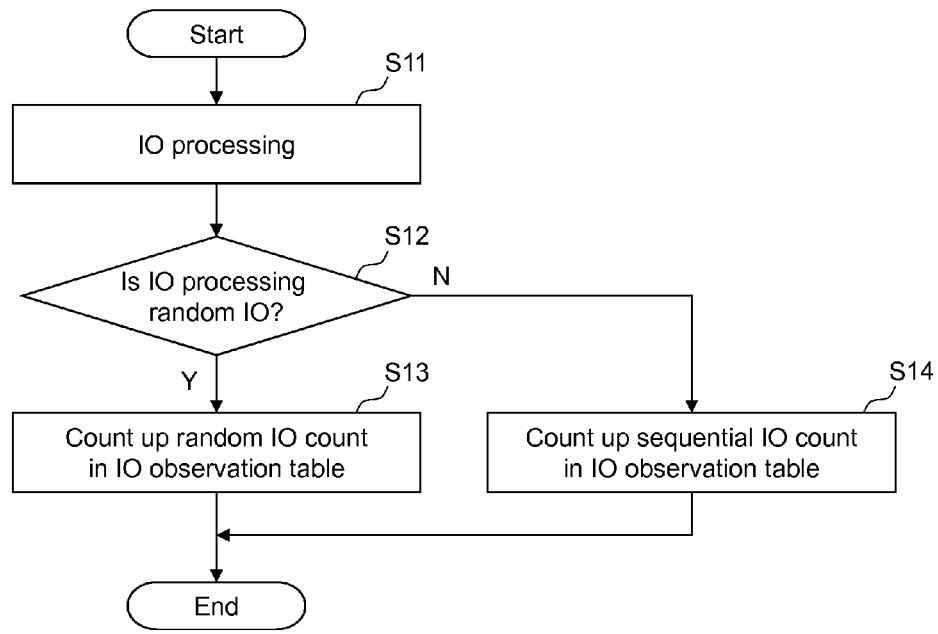
FIG. 9 is a flowchart of assistance in explaining observation processing operation for the number of random IOs and the number of sequential IOs.
FIG. 10 is a table of assistance in explaining conditions under which switching from the pool capacity compression mode to the access performance priority mode is effective.

Next, description will be given with regard to an instance where the pool storage mode is switched from the pool capacity compression mode to the access performance priority mode. FIG. 10 illustrates effective conditions for switching from the pool capacity compression mode to the access performance priority mode. FIG. 10 illustrates a relationship between a combination of the pool usage ratio, the pool aggregation ratio and the sequential IO ratio and the mode switching effect. Of these, the sequential IO ratio is the ratio of the sequential IOs to the overall IOs. When the sequential IO ratio is high, the number of reading and writing operations becomes small, and the access performance improves. FIG. 10 indicates that the switching of the pool storage mode to the access performance priority mode is observed to have an effect when both the pool usage ratio and the pool aggregation ratio are low and the sequential IO ratio is high.

Figure 11:
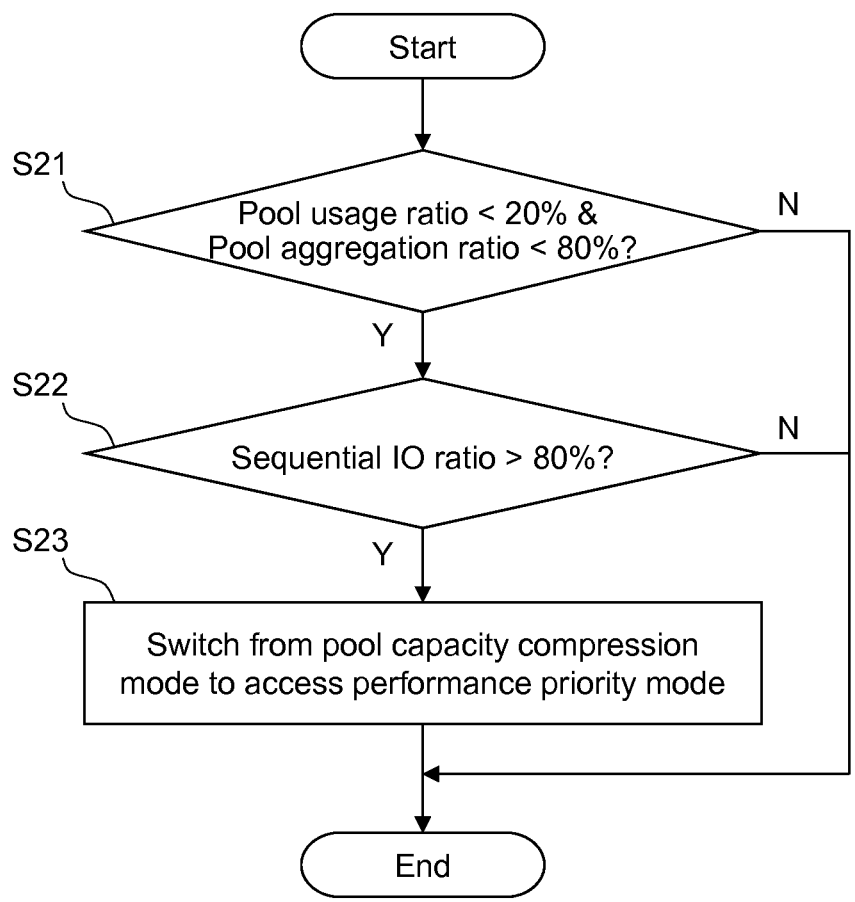
FIG. 11 is a flowchart illustrating a specific example of operation for determining the switching of the pool storage mode (an example of switching from the pool capacity compression mode to the access performance priority mode).

FIG. 11 illustrates an example of determination operation which is executed when the current pool storage operation is in the pool capacity compression mode. This determination operation is also executed by the channel adapter (CHA) 13. Incidentally, the determination operation is also automatically executed at periodic intervals or when a predetermined condition is established. The threshold values required for the determination operation are read from the table for the pool storage mode switching determination illustrated in FIG. 7.

Returning to description of FIG. 11, first, at the time of determination, the channel adapter 13 determines whether or not the pool usage ratio is lower than 20% and whether or not the pool aggregation ratio is lower than 80% (at step S21). When a negative result is obtained at step S21, the channel adapter 13 determines that a change to the access performance priority mode has no particular effect, and terminates this determination operation. When an affirmative result is obtained at step S21, the channel adapter 13 determines whether or not the sequential IO ratio is higher than 80% (at step S22). Also when a negative result is obtained at step S22, the channel adapter 13 determines that a change to the access performance priority mode has no particular effect, and terminates this determination operation. On the other hand, when an affirmative result is obtained at step S22, the channel adapter 13 switches the pool storage mode to the access performance priority mode, and then terminates the determination operation (at step S23).

Figure 12:
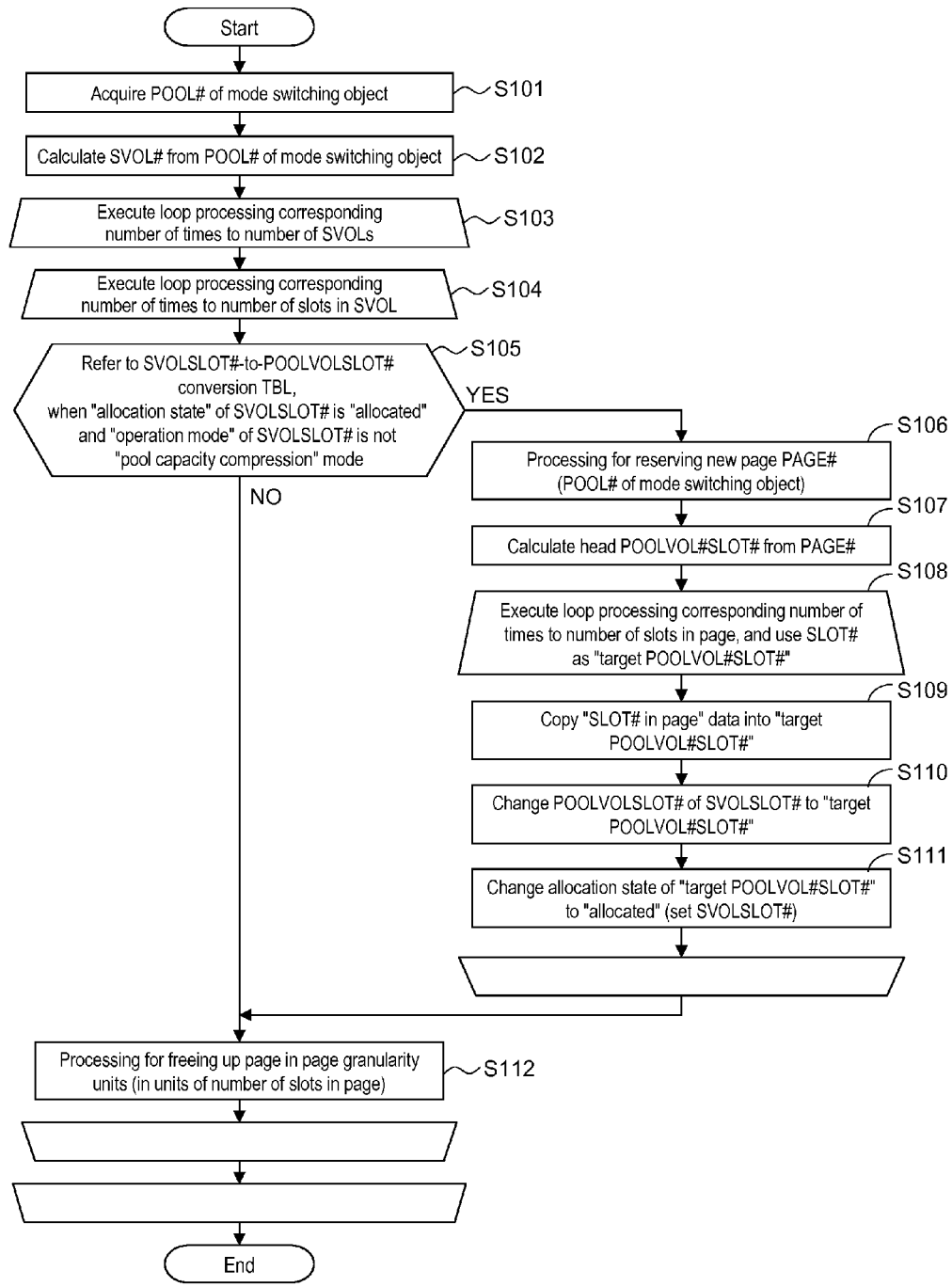
FIG. 12 is a flowchart of assistance in explaining processing operation which is executed at the time of switching from the access performance priority mode to the pool capacity compression mode.

Processing Operation Executed at the Time of Switching to Pool Capacity Compression Mode FIG. 12 illustrates processing operation executed when the pool storage mode is switched from the access performance priority mode to the pool capacity compression mode. The processing operation is also executed by the channel adapter 13.

First, the channel adapter 13 acquires the number of a pool in which the pool storage mode has been switched (at step S101). Then, the channel adapter 13 calculates the number of a physical volume SVOL# corresponding to the number of the pool targeted for the switching of the pool storage mode (at step S102). When there are plural numbers of the physical volumes calculated, the channel adapter 13 executes the corresponding number of loop processing operations to the number of SVOL# (at step S103). The following processing is executed for each specific physical volume as a processing object.

The channel adapter 13 executes the corresponding number of loop processing operations, to be described below, to the number of slots in the physical volume as the processing object (at step S104).

First, the channel adapter 13 refers to an SVOLSLOT#-to-POOLVOLSLOT# conversion table illustrated in FIG. 13 to determine whether or not the allocation state of SVOLSLOT# is an "allocated" state and whether the operation mode of SVOLSLOT# is not the "pool capacity compression" mode (or whether the operation mode thereof is the "access performance priority" mode) (at step S105). An example of the table illustrated in FIG. 13 illustrates an instance where all slots of all physical volumes are "allocated" and the operation mode is the "access performance priority" mode.

When an affirmative result is obtained at step S105, the channel adapter 13 executes processing for ensuring a new page (at step S106). Incidentally, when a negative result is obtained at step S105, the channel adapter 13 skips steps S106 to S111 to be described later, and goes to step S112.

Upon completion of the processing of step S106, the channel adapter 13 refers to a PAGE# management table illustrated in FIG. 14 and calculates a head slot number SLOT# of a specified page (at step S107). This processing is necessary in order to forward-fill and store slots in the page. When the head slot number SLOT# is obtained, the channel adapter 13 executes loop processing to be described below by the number of slots in the page (at step S108). Here, the channel adapter 13 uses the head slot number SLOT# corresponding to the number of times the loop processing is executed, as "target POOLVOL#SLOT#" for each execution.

Then, the channel adapter 13 copies slot number data in a page as a source (or a page to which POOLVOLSLOT# corresponding to SVOLSLOT# for which an affirmative result is obtained at step S105 belongs) to the "target POOLVOL#SLOT#" (at step S109). Then, the channel adapter 13 changes the slot number POOLVOLSLOT# on a pool volume corresponding to the slot number SVOLSLOT# on a physical volume moved to the "target POOLVOL#SLOT#" into the "target POOLVOL#SLOT#" (at step S110). Specifically, the correspondence in the table illustrated in FIG. 13 is updated.

Then, the channel adapter 13 changes the allocation state corresponding to the "target POOLVOL#SLOT#" in the table illustrated in FIG. 13 into "allocated," and changes the operation mode into "pool capacity compression" (at step S111). The processing from steps S108 to S111 is repeatedly executed by the number of slots which form the page. Upon completion of data migration from the page managed in the access performance priority mode to the page managed in the pool capacity compression mode, the channel adapter 13 releases the page as the source in page granularity units (at step S112).

After that, the channel adapter 13 returns to step S104, and repeats the processing from steps S105 to S112 for a different slot in the same physical volume. Then, upon completion of a series of processing for one physical volume, the channel adapter 13 returns to step S103, and repeats the processing from steps S104 to S112 for a different physical volume.

By the above processing operation, the rewriting of the table which manages the data placement related to the pool in which the pool storage mode is changed is completed, and thereafter, operation of the pool in the pool capacity compression mode becomes possible.

Figure 15:
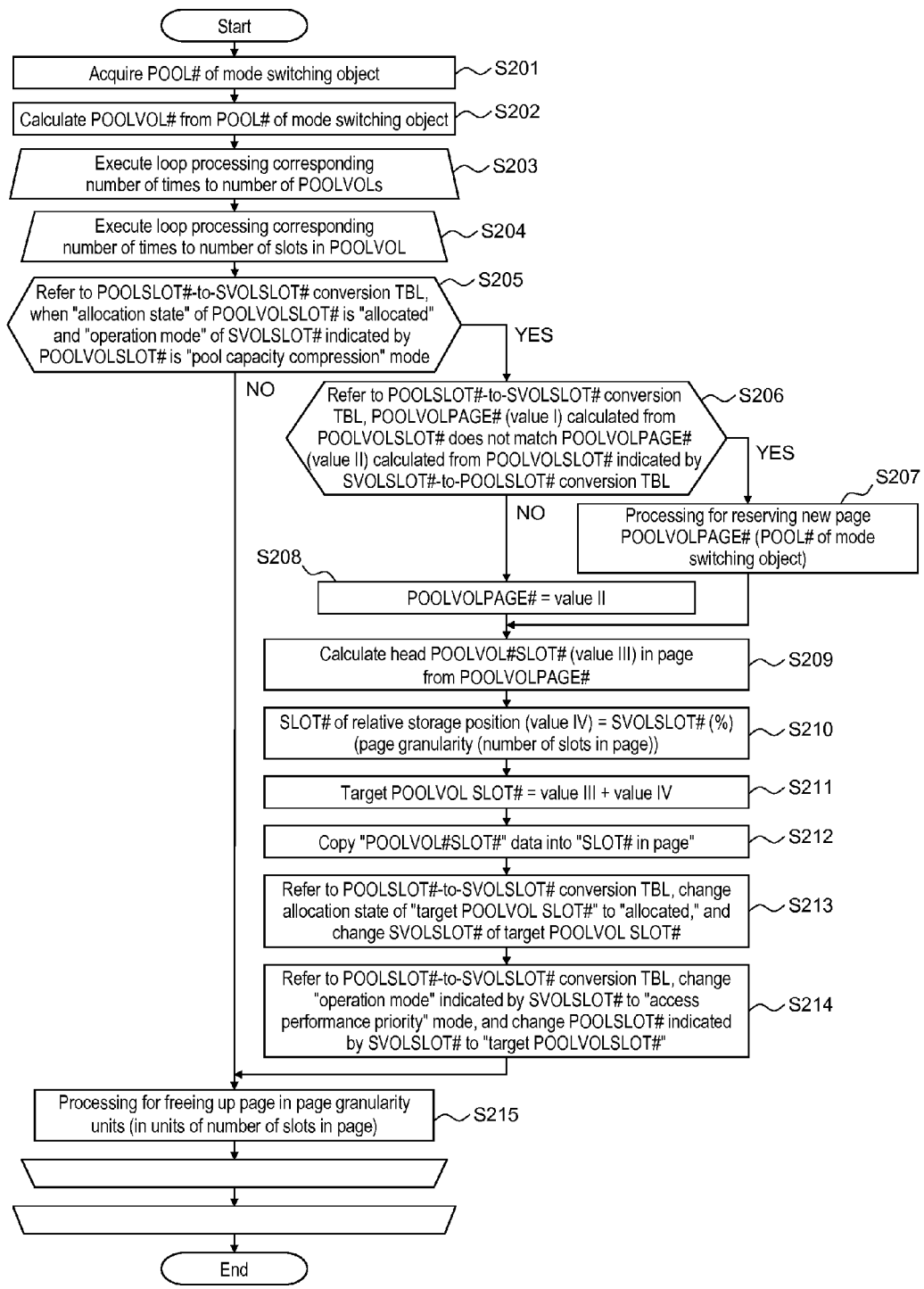
FIG. 15 is a flowchart of assistance in explaining table updating operation which is executed at the time of switching from the pool capacity compression mode to the access performance priority mode.

Processing Operation Executed at the Time of Switching to Access Performance Priority Mode FIG. 15 illustrates processing operation executed when the pool storage mode is switched from the pool capacity compression mode to the access performance priority mode. The processing operation is also executed by the channel adapter 13.

First, the channel adapter 13 acquires the number of a pool in which the pool storage mode has been switched (at step S201). Then, the channel adapter 13 calculates a pool volume number POOLVOL# corresponding to the number of the pool targeted for the switching of the pool storage mode (at step S202). When there are plural pool volume numbers POOLVOL# calculated, the channel adapter 13 executes the loop processing by the number of POOLVOL# (at step S203). The following processing is executed for each specific pool as a processing object.

The channel adapter 13 executes the loop processing to be described below by the number of slots in the pool as the processing object (at step S204).

First, the channel adapter 13 refers to a POOLSLOT#-to-SVOLSLOT# conversion table illustrated in FIG. 16 to determine whether or not the allocation state of POOLVOLSLOT# is an "allocated" state and whether the operation mode of POOLVOLSLOT# is not the "pool capacity compression" mode (at step S205). An example of the table illustrated in FIG. 16 illustrates an instance where all slots of all pool volumes are "allocated" and the operation mode is the "pool capacity compression" mode.

When an affirmative result is obtained at step S205, the channel adapter 13 goes to step S206, while when a negative result is obtained at step S205, the channel adapter 13 skips steps S206 to S214 to be described later, and goes to step S215.

When the channel adapter 13 goes to step S206, the channel adapter 13 determines whether or not a page number of a pool volume corresponding to POOLVOLSLOT# calculated for the POOLSLOT#-to-SVOLSLOT# conversion table illustrated in FIG. 16 matches a page number of a pool volume corresponding to POOLVOLSLOT# calculated for the SVOLSLOT#-to-POOLVOLSLOT# conversion table illustrated in FIG. 13.

When an affirmative result is obtained at step S206, the channel adapter 13 executes processing for ensuring a new page (at step S207). Specifically, a pool number as a mode switching object is specified as the page number of the pool volume. The pool number is the number obtained at step S201. On the other hand, when a negative result is obtained at step S206, the channel adapter 13 uses the page number of the pool volume corresponding to POOLVOLSLOT# calculated for the SVOLSLOT#-to-POOLVOLSLOT# conversion table illustrated in FIG. 13, as the page number of the pool volume (at step S208).

When the page number of the pool volume is determined, the channel adapter 13 refers to the PAGE# management table illustrated in FIG. 14 and calculates a head slot number SLOT# of the determined page number (at step S209). Then, the channel adapter 13 specifies a remainder obtained by dividing the slot number of the physical volume by the page granularity (or the number of slots which form the page), as a relative storage position slot number (at step S210).

Then, the channel adapter 13 specifies the sum of the value calculated at step S209 and the value calculated at step S210, as the slot number of the pool volume as the target (at step S211).

When the slot number of the pool volume as the target is determined, the channel adapter 13 copies POOLVOL#SLOT# data as the source to the slot number, to a slot number in a page specified by the "target POOLVOL#SLOT#" (at step S212).

Then, the channel adapter 13 refers to the POOLSLOT#-to-SVOLSLOT# conversion table illustrated in FIG. 16, changes the allocation state of the target POOLVOL#SLOT# into "allocated," and changes the slot number of the physical volume corresponding to the target POOLVOL#SLOT# (at step S213).

After that, the channel adapter 13 refers to the POOLSLOT#-to-SVOLSLOT# conversion table illustrated in FIG. 16, changes the operation mode indicated by the slot number of the physical volume changed at step S213 into the "access performance priority" mode and changes POOLSLOT# indicated by the slot number of the physical volume changed at step S213 into the target POOLVOL#SLOT# (at step S214).

After that, the channel adapter 13 frees up the page as the source in page granularity units (at step S215). Incidentally, this processing is executed at the time when all slots in the page are migrated.

Then, the channel adapter 13 returns to step S204, and repeats the processing from steps S205 to S215 for a different slot in the same pool volume. Then, upon completion of a series of processing for one pool volume, the channel adapter 13 returns to step S203, and repeats the processing from steps S204 to S215 for a different pool volume.

By the above processing operation, the rewriting of the table which manages the data allocation related to the pool in which the pool storage mode is changed is completed, and thereafter, operation of the pool in the access performance priority mode becomes possible.

CONCLUSION

As described above, the adoption of the storage device and a method for managing snapshot data according to the embodiment enables dynamically relocating data of a snapshot volume according to the use status of a pool.

For example, in the case of a user who uses snapshot data for backup applications (for example, when both the pool usage ratio and the random IO ratio are high and the pool aggregation ratio is low), the storage device according to the embodiment can automatically switch the pool storage mode from the access performance priority mode to the pool capacity compression mode.

In the case of this pool storage mode, slots are forward-filled and stored in each page, thus enabling maximization of effective utilization of the pool capacity. Incidentally, when the pool usage ratio and the pool aggregation ratio become low again due to an increase in the number of physical volumes allocated to the pools or deletion of data from the pool and, at the same time, the sequential IO ratio becomes high, the pool storage mode can be automatically switched to the access performance priority mode.

Also, in the case of a user who allocates a snapshot volume to a virtual server and uses it in an online environment (for example, when both the pool usage ratio and the pool aggregation ratio are low and the sequential IO ratio is high), the storage device according to the embodiment can automatically switch the pool storage mode from the pool capacity compression mode to the access performance priority mode.

In the case of this pool storage mode, the number of times the address conversion processing is to be performed is reduced and sequential access in the page is possible, thus improving the response performance and the throughput performance.

Incidentally, in the case of the storage device according to the embodiment, when during operation the pool usage ratio and the random IO ratio become high and the pool aggregation ratio becomes low, the pool storage mode can be automatically changed to the pool capacity compression mode thereby to cope with a load on the pool capacity or the like.

As described above, the adoption of the storage device and the method for managing snapshot data according to the embodiment enables properly switching the data allocation according to user's applications (or the use status of a pool).

Incidentally, when the management information (table) for management of allocation of a real address and a virtual address is partially or wholly held in a large-capacity memory (or a physical volume) such as a hard disk, access to the hard disk having a slower access speed than the shared memory 15 is increased, and thus, priority is given to the access performance priority mode so as to select the access performance priority mode as the pool storage mode. Specifically, the threshold values for use in the switching determination may be set for example so as to make it easy to change to the access performance priority mode and make it difficult to change to the pool capacity compression mode.

Other Embodiments

The present invention proposed herein is not limited to the above-described embodiment but may include various modifications. Actually, the above-described embodiment is for the purpose of facilitating the explanation of the present invention, and is not necessarily required to include all structural elements described. Also, as for some of the structural elements of each embodiment, addition, removal or replacement of other structural elements may be carried out.

For example, in the above-described embodiment, description has been given with regard to an instance where switching from the access performance priority mode to the pool capacity compression mode is determined based on the pool usage ratio, the pool aggregation ratio and the random IO ratio; however, a simple approach for making a determination may use only the pool usage ratio and the pool aggregation ratio to determine the switching from the access performance priority mode to the pool capacity compression mode. In this case, when the pool usage ratio is high and the pool aggregation ratio is low, a determination may be made that the effect of the switching from the access performance priority mode to the pool capacity compression mode is achieved.

Also, in the above-described embodiment, description has been given with regard to an instance where switching from the pool capacity compression mode to the access performance priority mode is determined based on the pool usage ratio, the pool aggregation ratio and the sequential IO ratio; however, a simple approach for making a determination may use only the pool usage ratio and the pool aggregation ratio to determine the switching from the pool capacity compression mode to the access performance priority mode. In this case, when both the pool usage ratio and the pool aggregation ratio are low, a determination may be made that the effect of the switching from the pool capacity compression mode to the access performance priority mode is achieved.

Also, the above-described configurations, functions, processors and processing means and the like may be partially or wholly designed for example as an integrated circuit so that they are implemented in hardware. Information on programs, tables, files and the like for implementation of the functions may be placed in a recording device such as a memory, a hard disk or an SSD (Solid State Drive), or a recording medium such as an IC card, an SD card or a DVD. Also, control lines and information lines which are necessary for explanation are illustrated, and all control lines and information lines are not necessarily illustrated for a product. Actually, almost all configurations may be considered as being interconnected.

REFERENCE SIGNS LIST 1 storage device
2 control unit
11 target port
12 initiator port
13 channel adapter (CHA)
14 cache memory (CACHE)
15 shared memory (SM)
16 disk adapter (DKA)
20 storage unit
30 management PC

The invention claimed is:

1. A storage device comprising:
a storage unit configured to provide a physical volume to an external device; and
a control unit configured to manage the physical volume in correspondence with a pool and to control input and output of data between the external device and the storage unit,
wherein the control unit dynamically switches a storage mode to be applied to the pool to any one of a first storage mode in which snapshot data is aggregated in a specific pool volume and a second storage mode in which the snapshot data is distributed to a plurality of pool volumes, based on a capacity usage ratio and an access status of the pool; wherein, when a usage ratio of a certain pool is higher than a first threshold value and an aggregation ratio of the pool is lower than a second threshold value, the control unit switches the storage mode to be applied to the pool from the second storage mode to the first storage mode.

2. The storage device according to claim 1, wherein, when a usage ratio of a certain pool is higher than a first threshold value, an aggregation ratio of the pool is lower than a second threshold value and a random IO ratio of the pool is higher than a third threshold value, the control unit switches the storage mode to be applied to the pool from the second storage mode to the first storage mode.

3. The storage device according to claim 1, wherein, when a usage ratio of a certain pool is lower than a fourth threshold value and an aggregation ratio of the pool is lower than a fifth threshold value, the control unit switches the storage mode to be applied to the pool from the first storage mode to the second storage mode.

4. The storage device according to claim 1, wherein, when a usage ratio of a certain pool is lower than a fourth threshold value, an aggregation ratio of the pool is lower than a fifth threshold value and a sequential IO ratio of the pool is higher than a sixth threshold value, the control unit switches the storage mode to be applied to the pool from the first storage mode to the second storage mode.

5. The storage device according to claim 1, wherein, when information for management of correspondence between address space of the physical volume and address space of the pool is partially or wholly stored in the storage unit, the control unit controls switching of the storage mode to be applied to the pool such that priority is given to the second storage mode.

6. The storage device according to claim 1, wherein the threshold values are capable of being freely changed by user's setting.

7. The storage device according to claim 1, wherein the control unit includes
a first interface through which data is inputted from and outputted to the external device;
a channel adapter configured to control bidirectional copy operation and to control the switching of the storage mode;
a cache memory configured to hold read data and write data;
a shared memory configured to hold management information for control of the bidirectional copy operation; and
a second interface through which data is inputted from and outputted to the physical volume.

8. A method for controlling a storage device including a storage unit configured to provide a physical volume to an external device, and a control unit configured to manage the physical volume in correspondence with a pool and to control input and output of data between the external device and the storage unit,
wherein the control unit dynamically switches a storage mode to be applied to the pool to any one of a first storage mode in which snapshot data is aggregated in a specific pool volume and a second storage mode in which the snapshot data is distributed to a plurality of pool volumes, based on a capacity usage ratio and an access status of the pool; and
wherein, when a usage ratio of a certain pool is higher than a first threshold value and an aggregation ratio of the pool is lower than a second threshold value, the control unit switches the storage mode to be applied to the pool from the second storage mode to the first storage mode.

9. The method for controlling the storage device according to claim 8, wherein, when a usage ratio of a certain pool is higher than a first threshold value, an aggregation ratio of the pool is lower than a second threshold value and a random IO ratio of the pool is higher than a third threshold value, the control unit switches the storage mode to be applied to the pool from the second storage mode to the first storage mode.

10. The method for controlling the storage device according to claim 8, wherein, when a usage ratio of a certain pool is lower than a fourth threshold value and an aggregation ratio of the pool is lower than a fifth threshold value, the control unit switches the storage mode to be applied to the pool from the first storage mode to the second storage mode.

11. The method for controlling the storage device according to claim 8, wherein, when a usage ratio of a certain pool is lower than a fourth threshold value, an aggregation ratio of the pool is lower than a fifth threshold value and a sequential IO ratio of the pool is higher than a sixth threshold value, the control unit switches the storage mode to be applied to the pool from the first storage mode to the second storage mode.

12. The method for controlling the storage device according to claim 8, wherein, when information for management of correspondence between address space of the physical volume and address space of the pool is partially or wholly stored in the storage unit, the control unit controls switching of the storage mode to be applied to the pool such that priority is given to the second storage mode.

13. The method for controlling the storage device according to claim 8, wherein the threshold values are capable of being freely changed by user's setting.

* * * * *